United States Patent
Ebbinge

[15] 3,638,090
[45] Jan. 25, 1972

[54] DRIVING ARRANGEMENT FOR THE DRUM OF A WASHING MACHINE

[72] Inventor: Willem Ebbinge, Emmasingel, Eindhoven, Netherlands

[73] Assignee: U.S. Philips Corporation, New York, N.Y.

[22] Filed: May 27, 1969

[21] Appl. No.: 828,128

[30] Foreign Application Priority Data

May 30, 1968  Netherlands..........................6807615

[52] U.S. Cl..............................................318/345, 318/349
[51] Int. Cl. ......................................................H02p 5/16
[58] Field of Search ........................318/305, 334, 345, 349

[56] References Cited

UNITED STATES PATENTS

| | | | |
|---|---|---|---|
| 1,998,670 | 4/1935 | Goshorn | 219/368 |
| 2,667,613 | 1/1954 | Trevitt | 318/305 |
| 2,939,064 | 5/1960 | Momberg | 318/345 |
| 3,049,655 | 8/1962 | Long | 318/334 |
| 3,184,665 | 5/1965 | Wright | 318/345 |
| 3,422,330 | 1/1969 | Swanke | 318/305 |

FOREIGN PATENTS OR APPLICATIONS

| | | | |
|---|---|---|---|
| 921,158 | 10/1954 | Germany | 318/349 |
| 1,150,325 | 6/1963 | Germany | 318/334 |

*Primary Examiner*—Oris L. Rader
*Assistant Examiner*—Thomas Langer
*Attorney*—Frank R. Trifari

EXEMPLARY CLAIM

1. In an automatic washing machine including a commutating electric motor for driving the drum of the washing machine at a first comparatively low-washing speed and at a second comparatively high-spin-drying speed, the improvement comprising an automatic speed adjusting circuit for said motor comprising, a pair of input terminals adapted for connection to an AC voltage supply source, a supply circuit for the motor connected to the input terminals and provided with at least two further terminals, an electric heating element arranged to heat the wash water and connected across said two further terminals, a controlled rectifier connected in the supply circuit so as to regulate the motor speed at a given washing speed, and means connecting said two further terminals in the motor supply circuit so that the motor is at least substantially energized through at least a part of the heating element whereby it exhibits a speed characteristic which decreases very sharply with increasing load.

8 Claims, 5 Drawing Figures

PATENTED JAN 25 1972

INVENTOR.
WILLEM EBBINGE
BY
Frank R. Trifari
AGENT

DRIVING ARRANGEMENT FOR THE DRUM OF A WASHING MACHINE

This invention relates to an arrangement including a commutating electric motor for driving the drum of a washing machine provided with at least one electric heating element, especially an automatic washing machine having at least one comparatively low-washing speed and also at least one comparatively high-spin-drying speed, which arrangement has a pair of input terminals for connection to a source of supply voltage and a supply circuit for the motor connected to these terminals.

Such arrangements are known and are at present used in most automatic washing machines. At least two widely different speeds (ratios of the order of 1:20 or more are commonly used) are obtained in various manners, for example, by means of two different motors, by means of a kind of gearbox having at least two speeds, by the use of two or more belt or cord drives with different ratios or by a transformer provided with tappings enabling a single motor to be energized with different voltages.

It is an object of the invention to provide a simplified, particularly lightweight and cheap and yet reliable arrangement of the aforementioned kind. The invention is based on the experience that when a self-commutating electric motor is energized through a resistor of sufficient value its load can be increased to an extent such that, it runs regularly at an unexpectedly low speed without exceeding the permissible motor current. In other words, the motor acquires a kind of highly exaggerated series characteristic. The invention is also based on the recognition that just this characteristic is very useful in a washing machine because, during the washing operation, when the tub is full of water which must be kept hot or be heated, the motor is heavily loaded and will consequently run at a low speed and consume much current. As a result, the energy dissipated in a series resistor will be large and may be utilized for heating or keeping the water hot, whereas during the spin-drying operation, when the water has been discharged from the tub, the motor is only lightly loaded and will reach a high speed while consuming little current so that the energy dissipated in a series resistance will be comparatively small and can readily be removed, even without water cooling.

The arrangement in accordance with the invention is characterized in that it is provided, in addition to the aforementioned input terminals, with at least two further terminals for the connection of a heating element of the washing machine. The latter terminals are included in the motor supply circuit so that the motor is at least substantially energized through at least part of this heating element, whereby it exhibits a speed characteristic which very strongly decreases with increasing load.

It should be noted that it is known from the U.S. Pat. No. 1,998,670 to feed an electric motor through a heating element. This patent is however concerned with a fan motor which serves to maintain the air circulation about a heating element of an electric stove in order to provide a better distribution of heated air by forced convection. Consequently, this motor operates with a substantially constant small load and always runs at a normal, comparatively high speed, so that it does not make use of an exaggerated series characteristic and/or of the aforementioned related useful effects occurring in a washing machine.

The invention may be used with any kind of commutating motor: with commutator motors provided with series shunt or compound energization or energization by a permanent magnet fed with smoothed or unsmoothed direct current or with alternating current, or with motors having a rotating permanent magnet, for example, with commutatorless motors provided with an electronic commutator, for example, motors using Hall plates as control elements.

During a washing cycle the load on the motor varies with the amount of washing goods with which the drum of the washing machine is filled and/or with the level of the water in the tub of the machine, whereas the washing effect is an optimum at a given speed of revolution. Therefore the arrangement preferably includes a known control device by which the motor speed is regulated at at least one washing speed. In an arrangement for connection to an alternating voltage supply source, this control device may, for example, include a controlled rectifier by which the motor speed is regulated.

Features and advantages of the invention will appear from the following description of embodiments thereof, given by way of example only, with reference to the accompanying drawings, in which.

Figure 1:
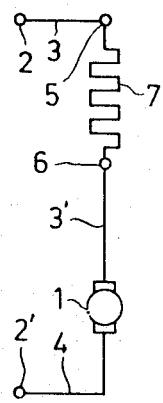
FIG. 1 is a circuit diagram showing the basic elements of a simple embodiment of an arrangement in accordance with the invention.

In the simplest possible embodiment shown in FIG. 1, the arrangement according to the invention comprises a commutating electric motor 1, for example, a motor with permanent-magnet energization. It further comprises a pair of input terminals 2, 2' for connection to a voltage supply source and a supply circuit 3, 3', 4 for the motor 1 connected to the said terminals. According to the invention the arrangement is provided with two further terminals 5 and 6 for the connection of a heating element 7 of the washing machine. These terminals 5, 6 are included between the parts 3 and 3' of the motor supply circuit 3, 3', 4 so that the motor 1 is energized through the heating element 7.

In a practical embodiment the motor 1 was a motor provided with permanent-magnet energization rated for a DC supply voltage of 220 volts, with a maximum current of 6.4 amperes at a heavy load and designed for driving the drum of a washing machine at a spin-drying speed of 800 revolutions per minute. The heating element 7 had a resistance value of 32 ohms and was proportioned to be likewise connected to a 220 volts supply voltage in the case of water cooling.

Figure 2:
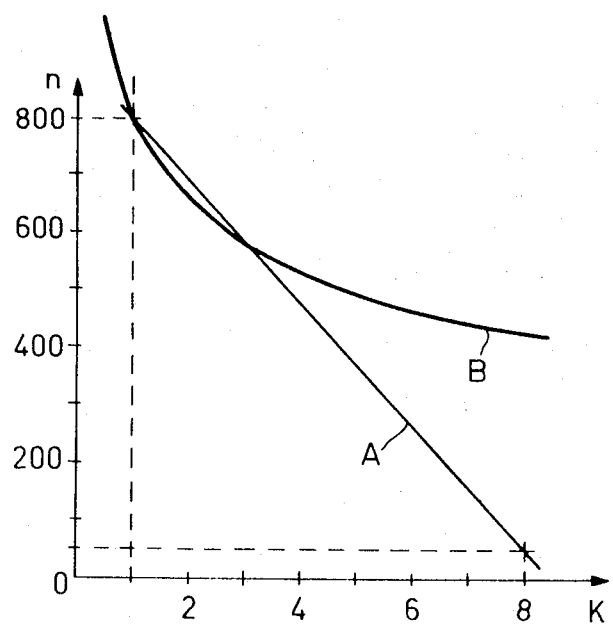
FIG. 2 shows the speed vs. torque characteristic of the motor of the arrangement shown in FIG. 1 compared with the characteristic of a conventional series-energized commutator motor.

Line A of FIG. 2 shows the speed-torque characteristic (speed $n$ as a function of the load torque $K$) of the motor 1 of the arrangement shown in FIG. 1 when supplied with a direct voltage of 220 volts through the heating element 7 having a resistance value of 32 ohms.

Curve B of FIG. 2 shows, by way of comparison, the characteristic of a conventional series-energized commutator motor supplied directly with a direct voltage of 220 volts.

At a small load, which corresponds to the spin-drying operation, the motor 1 runs at a speed of 800 revolutions per minute and this speed can increase only by a small amount (to about 900 revolutions per minute) at a theoretical zero load torque. Under a heavy load ($k=8$, which corresponds to a current of 6.4 amperes) this motor runs at a constant speed of only 50 revolutions per minute. The attained speed ratio is thus 16 to 1.

By way of comparison the curve B of FIG. 2 shows that with a conventional series-energized commutator motor directly fed with its rated voltage, the ratio between normal speed at a small load, which corresponds to the spin-drying operation ($K=1$), and the speed at the maximum permissible load ($K=8$) is not even 2 to 1.

In a washing machine the characteristic A provides many important advantages:

a. changing from a low-washing speed to a high-spin-drying speed or vice versa can be automatically effected by decreasing or increasing the load by draining or filling the tub with water.

b. The peak starting current of the motor is limited by the resistance of the heating element.

c. Acceleration to the spin-drying speed is very gradual, especially if the motor is started before the tub has been completely drained. Consequently, the mechanical starting shock is heavily damped or even entirely suppressed while the articles to be washed are distributed about the drum in an optimum manner since the speed increases slowly during the draining of the tub.

d. The resistance of the heating element prevents the motor from reaching an excessive spin-drying speed, for example, in the case of an abnormally high-supply voltage, and protects the arrangement in the case of a short circuit of the motor and/or of its supply circuit and/or if the drum locks.

e. The energy dissipated in the heating element is largest during the washing operation when the water in the tub must be heated or kept hot, but during the spin-drying operation it is so small that it can readily be carried away by the air then contained in the tub without inconvenience for the element, the machine and/or the articles being washed.

f. Finally, when the supply circuit of the motor is interrupted, the motor can rapidly be brought to a standstill by short circuiting it through the heating element so that much more costly protection devices can be economized.

Figure 3:
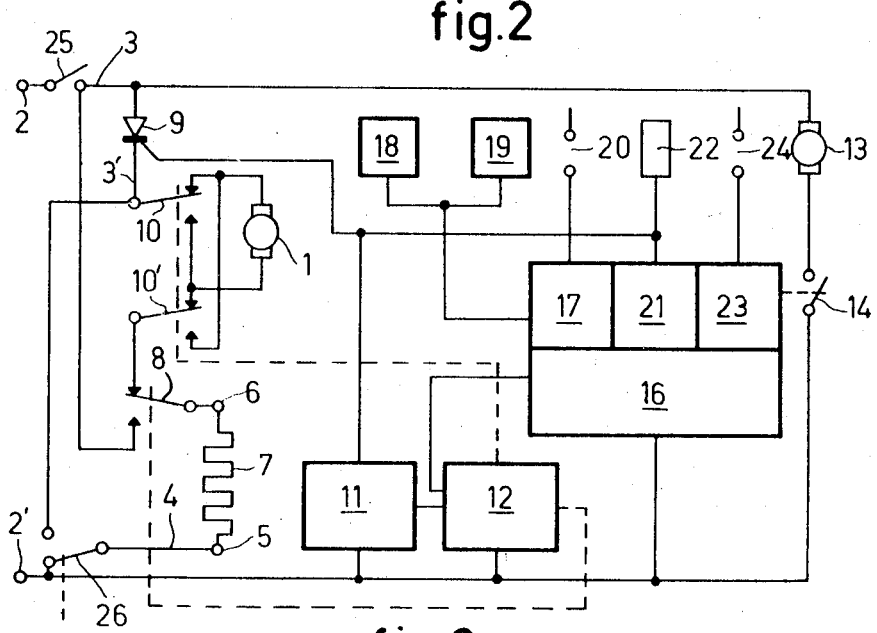
FIG. 3 is a circuit diagram showing the basic elements of an automatic washing machine equipped with a second embodiment of the arrangement in accordance with the invention.

The automatic washing machine the basic circuit diagram of which is shown in FIG. 3 includes a second embodiment of the arrangement in accordance with the invention. In this embodiment the motor supply circuit includes a first changeover switch 8, for example, in the form of a relay changeover contact, by means of which the heating element can be directly connected across an alternating-voltage supply 2, 2' to speed up the heating of the water contained in the tub of the machine. This supply circuit includes, in series with the switch 8, a double-pole changeover switch 10, 10', for example, likewise in the form of relay changeover contacts capable of reversing the direction of the current flowing through the motor 1 and hence the direction of rotation of this motor, and a controlled semiconductor rectifier or thyristor 9 by means of which, at at least one washing speed, the motor speed is regulated by simple controlled rectification of the current flowing through the heating element 7 and the motor 1.

Apart from the above-described arrangement the automatic washing machine includes a motor governor 11 by which the thyristor 9 is controlled during the washing operation so that the motor 1 drives the drum of the machine at a substantially constant speed of, say, 50 revolutions per minute. The machine further includes a reversing circuit 12 which controls the switches 8 and 10, 10' so that, during the washing operation the motor 1 alternately and with time intervals rotates in one direction and then in the other direction whereby, during the heating and during the time intervals, the switch 8 can be brought into its lower position so that, if required, a larger electric power is dissipated in the heating element.

The automatic washing machine is provided with a second motor 13 which drives a water pump capable of draining the machine tub. This motor is controlled by a switch 14, for example, a relay contact, which is in turn controlled by a programming device.

The programming device, which also is shown diagrammatically only, comprises a cycle counter 16 by which three electronic switching devices are operated in the correct sequence:

a filling device 17 by which two water supply valves 18 and 19 are opened in a predetermined order and are closed again when the water in the tub reaches a level determined by a detector 20;

a heater 21 by which the thyristor is cut off when the temperature of the water in the tub measured by a transducer 22, for example, a NTC resistor, reaches a predetermined value, for example, 90° C.;

a pump control device 23, which is controlled by a second water level detector 24.

The cycle of operations of the reversing circuit 12 is also controlled by the cycle counter 16.

The automatic washing machine is provided with a switch 25 which is rendered operative by the pump control device 23 and switches off the machine when the water level measured by the second level detector 24 becomes zero during the spin-drying operation. Finally, the system includes a safety switch 26.

The automatic washing machine described can carry out, for example, the following program:

After switching on, the first program cycle (preliminary washing) commences: the tub is first filled with water, with the addition of a washing agent as the case may be, through the first valve 18.

At the instant at which the correct water level is reached, the motor 1 is started through the cycle counter 16 and under the control of the heater 21 and the transducer 22. The operating cycle of the reversing circuit 12 is such that the motor runs alternately in both directions for periods of 12 seconds with time intervals of 3 seconds. The temperature rises slowly because the heating element 7 is directly connected to the input terminals during the short time intervals only, during which it dissipates a power of, say 3 kilowatts, whereas with a running motor its dissipation is restricted to, say, 1 kilowatt. When the temperature of the water reaches a value of, say, 30° C. the motor 13 is switched on through the counter 16 by the switch 14 and under the control of the device 23 and the second level detector 24 which switches it out again as soon as the tub is empty, whereby the motor 1 can be switched out if desired, for example, by 21, 22, but this is not necessary.

The second program cycle (washing) proceeds similarly to the first, with the difference that the tub is now filled through the second valve 19, with washing agent added, and that the cycle of operations of the reversing circuit is changed through cycle counter 16, for example, to running for periods of 3 seconds in alternate directions with time intervals in-between of 12 seconds, and that a different temperature limit of, say, 90° C. can be chosen for this program cycle.

The third program cycle (rinsing) proceeds similarly to the first, with the sole difference that the tub is filled again through the second valve 19, but without the addition of washing agent.

The next few (for example, three) program cycles (rinsing) proceed similarly to the third but without heating during the intervals and without the use of the temperature limit, the step controlled by elements 21, 22 being skipped.

The last program cycle (spin-drying) consists in that the motor governor 11 switches to the spin-drying speed before the tub is fully drained by the motor 13. In this process the reversing circuit 12 is rendered inoperative by the cycle counter 16 and a power of only about 150 watts is dissipated in the heating element 7.

When the supply of water to the tub from the drum and from the washing goods ceases, the machine is switched off by the switch 25 and all its components return to their respective rest positions, in which they remain until the machine is started again. If the machine is inadvertently opened during operation, the door or cover automatically switches the safety switch 26 from the operative position shown to the other position in which it interrupts the lead 4 of the supply circuit and short circuits the motor 1 through the heating element 7, the switch 8 and the reversing switch 10, 10' so that the motor is vigorously braked by this circuit and is brought to a standstill within a very short time (of the order of 3 seconds) even from the highest spin-drying speed.

It should be noted that the motor can also be stopped by cutting off the thyristor 9, in which case no electric power is supplied to the heating element 7 during the intervals. It will have attracted notice that the described automatic washing machine does not include any of the otherwise commonly used time-measuring devices. The cycle counter 16 is simply switched from one cycle to the next under the control of the transducers 20, 22 and 24, and the time-measuring device is replaced by an accurate temperature transducer 22. This provides equally satisfactory or even better washing results than with the use of a more expensive time-measuring device.

Figure 4:
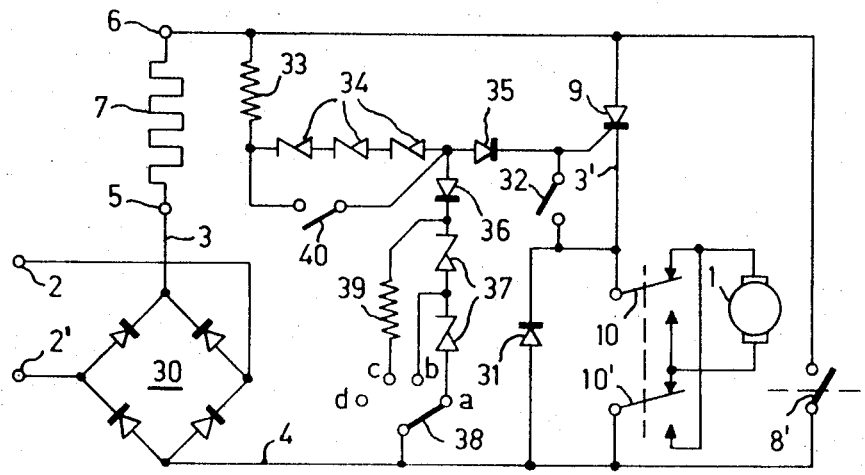
FIG. 4 is a circuit diagram of a third embodiment.

FIG. 4 shows a third embodiment of the arrangement in accordance with the invention. This embodiment mainly differs from that shown in FIG. 3 by the inclusion of a full-wave rectifying bridge circuit 30 between the input terminals 2, 2' and the motor supply circuit 3, 3', 4 provided with the further terminals 5 and 6, between which the heating element 7 is shown. Furthermore, the changeover switch 8 of FIG. 3 is replaced by a short-circuiting switch 8', and a flywheel diode 31 is connected across the motor 1 and the reversing switch 10, 10'.

By the use of the supply rectifier 30 the power supplied to the motor and to the heating element 7 through the thyristor during each half cycle of the AC supply voltage is about doubled so that the motor 1 can produce a higher torque, even with increased dissipation in the heating element 7.

The flywheel diode 31 ensures that the thyristor 9 is extinguished between successive half cycles of the AC supply voltage and of the rectified voltage across the output terminals of the full-wave rectifier 30. It may also contribute somewhat to the improvement of the control properties and of the form factor of the arrangement, at least at certain speeds. An embodiment of the motor governor similar to the motor governor 11 of FIG. 3 is shown in detail in FIG. 4. The motor 1 is switched off by means of a switch 32, by which the control electrode of the thyristor 9 can be directly connected to its cathode so that the thyristor can no longer be fired. If electric energy is to be dissipated in the heating element 7 with the motor stationary, the switch 8' can be switched on.

The control electrode of the thyristor is also connected to its anode through a resistor 33 of, say, 4.7 kΩ in series with three Zener diodes 34 having an overall Zener voltage of, say, 225 volts and with a diode 35 connected in the forward direction. A control circuit is connected to the junction point of the diode 35 and the Zener diodes 34. This comprises a second diode 36 connected in the forward direction and two further Zener diodes 37 each having a Zener voltage of 7.5 volts. A control switch 38 is connected to the negative lead 4 of the motor supply circuit. This switch has four positions. In its first position $a$ it connects the end of the control circuit 36, 37 remote from the diode 35 to the lead 4. The firing of the thyristor 9 through the circuit 33, 34, 35 is then delayed by the control circuit 36, 37, so that the motor 1 runs at a controlled normal washing speed of 50 revolutions per minute stabilized by the counteraction of its back E.M.F. in the cathode circuit of the thyristor 9.

In its second position $b$ the switch 38 connects the junction point of the two Zener diodes 37 to the lead 4 so that the firing of the thyristor 9 is even more delayed by the circuit 36, 37. The back E.M.F. of the motor 1 is compared now to the forward voltage across only one of the Zener diodes 37. Accordingly the motor 1 runs at a stabilized, particularly low-washing speed of only 25 revolutions per minute.

In its third position $c$ the switch 38 connects the cathode of the diode 36 to the lead 4 through a resistor 39 of, say, 4.7 kΩ, the Zener diode being short circuited by a switch 40 which is coupled to the switch 38. The back E.M.F. of the motor 1 is then compared to the voltage drop across the resistor 39. If this back E.M.F. is equal to zero (for example at starting), the thyristor 9 becomes conductive as soon as its anode voltage exceeds the sum of the voltage drop across the resistor 33, the threshold voltage of the diode 35 and the threshold voltage of the path between its control electrode and its cathode. The resistor 39 is chosen such that the motor 1 is accelerated to a reduced spin-drying speed of 350 revolutions per minute and continues running at this stabilized speed.

In the positions $a$ and $b$ of a practical embodiment of the arrangement the variations of the motor speed due to load variations (between $K=1$ and $K=8$ in FIG. 2) and to variations of the AC supply voltage of ±10 percent were between −4 and +6 percent, and the speed variations due to variations of the ambient temperature between 26° and 61° C. were between −0.6 percent and +2.1 percent.

In its fourth position $d$ the control switch 38 is open and renders the control circuit 36, 37 inoperative while the Zener diodes 34 are short circuited by the switch 40. The thyristor 9 begins to conduct as soon as its anode voltage minus the back E.M.F. of the motor 1 exceeds the sum of the threshold voltages of the diode 35 and of the control electrode-cathode path of the thyristor. The motor 1 is supplied with substantially complete half cycles of the AC supply voltage and is accelerated at an even higher rate than in the third position of the control switch 38. It reaches a spin-drying speed of 725 revolutions per minute and continues running at this speed.

Figure 5:
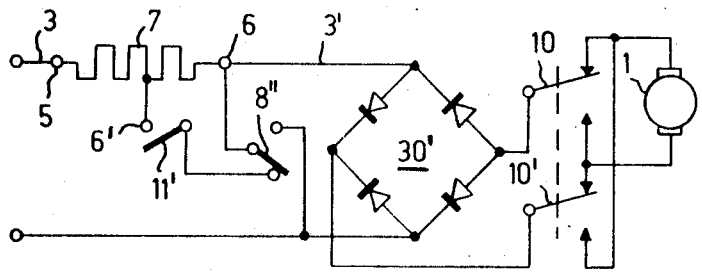
FIG. 5 is a circuit diagram of a fourth embodiment of the arrangement in accordance with the invention.

FIG. 5 is a circuit diagram of a fourth embodiment. In this embodiment the rectifying bridge 30 of FIG. 4 is replaced by a rectifying bridge 30' the output terminals of which are directly connected to the input terminals of the reversing switch 10, 10'. The bridge input terminals are connected to the input terminal 2' of the device through the lead 4 of the motor supply circuit and to the further terminal 6 through the lead 3' of the same supply circuit, respectively. In addition, the switch 8' of FIG. 4 is replaced by a changeover switch 8'' connected between the input terminals of the rectifier bridge 30'. This provides the advantage that the rectifier 30' need not supply the high-heating power to the heating element 7 when this element is connected to the full supply voltage through the switch 8''. Consequently, the heating element 7 is always fed with alternating current.

The arrangement includes a third further terminal 6' to which a tapping of the heating element 7 is to be connected and which can alternatively be connected to the further terminal 5 in the absence of such a tapping. The motor governor 11 of FIG. 3 or 33-40 of FIG. 4 is here replaced by a two-position governor provided with a switch 11' by which either part or the whole of the heating element 7 can be short circuited when the rectifier 30' is not short circuited. This switch can, for example, be a normally open contact of a relay energized by an adjustable portion of the back E.M.F. of the motor 1 or of the voltage delivered by a tachogenerator.

What is claimed is:

1. In an automatic washing machine including a commutating electric motor for driving the drum of the washing machine at a first comparatively low-washing speed and at a second comparatively high-spin-drying speed, the improvement comprising an automatic speed adjusting circuit for said motor comprising, a pair of input terminals adapted for connection to an AC voltage supply source, a supply circuit for the motor connected to the input terminals and provided with at least two further terminals, an electric heating element arranged to heat the wash water and connected across said two further terminals, a controlled rectifier connected in the supply circuit so as to regulate the motor speed at a given washing speed, and means connecting said two further terminals in the motor supply circuit so that the motor is at least substantially energized through at least a part of the heating element whereby it exhibits a speed characteristic which decreases very sharply with increasing load.

2. A washing machine as claimed in claim 1 further comprising a switch by which the further terminals can be directly connected to the input terminals in the cutoff condition of the motor, and means connecting the switch across the series combination of the motor and the controlled rectifier.

3. A washing machine as claimed in claim 2 wherein the supply circuit includes a full wave bridge rectifier, means connecting one of the further terminals to one of the input terminals and another one of the further terminals to one of the input terminals of the bridge rectifier, and means connecting the switch between the two input terminals of the bridge rectifier.

4. A washing machine as claimed in claim 1 further comprising a braking switch by which the motor can be connected across the heating element when the motor supply circuit is interrupted.

5. A washing machine as claimed in claim 1 further comprising means for varying the mechanical load on the motor during a given washing cycle.

6. An automatic speed control circuit for an electric motor subject to a wide variation in load during a normal cycle of operation comprising, a source of supply voltage, said motor having a given speed torque characteristic if connected to said supply voltage such that it exhibits a given speed variation between the expected minimum and maximum values of load, means for varying the load on the motor between said minimum and maximum load values during a normal cycle of operation of the motor, a controlled rectifier connected in series with the motor, means for adjusting the firing angle of said controlled rectifier as a function of motor speed so as to regulate the motor speed at one of said load values, a resistor, and means connecting at least a part of said resistor in series with the motor across said voltage source so that the speed characteristic of the motor is changed to substantially increase said given speed variation between said expected minimum and maximum values of load.

7. A control circuit as claimed in claim 6 for use in an automatic washing machine and further comprising a programming device controlling said load varying means and the wash cycle, means controlled by said programming device for periodically deactivating the motor during a wash cycle, and switching means controlled by the programming device for selectively connecting said resistor directly across the voltage source during the time the motor is deactivated during a wash cycle.

8. A control circuit as claimed in claim 7 wherein said resistor is a heating element located so as to heat the wash water, said circuit further comprising a braking switch for selectively connecting the heating element across the motor in the event that the motor supply circuit is opened.

* * * * *